United States Patent
Wu et al.

(10) Patent No.: US 10,494,556 B2
(45) Date of Patent: Dec. 3, 2019

(54) MAGNETIC AND THERMALLY CONDUCTIVE MATERIAL AND THERMALLY CONDUCTIVE AND DIELECTRIC LAYER

(71) Applicant: INDUSTRIAL TECHNOLOGY RESEARCH INSTITUTE, Hsinchu (TW)

(72) Inventors: Chun-Pin Wu, Tainan (TW); Mean-Jue Tung, Jincheng Township (TW); Ching-Chen Hsieh, Hemei Township (TW); Wei-Ta Yang, Taoyuan (TW); Meng-Song Yin, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 206 days.

(21) Appl. No.: 14/982,834

(22) Filed: Dec. 29, 2015

(65) Prior Publication Data
US 2017/0158933 A1 Jun. 8, 2017

(30) Foreign Application Priority Data
Dec. 8, 2015 (TW) .............................. 104141059 A

(51) Int. Cl.
*C09K 5/14* (2006.01)
*H01F 1/01* (2006.01)

(52) U.S. Cl.
CPC ..................................... *C09K 5/14* (2013.01); *H01F 1/01* (2013.01)

(58) Field of Classification Search
CPC .............. C09K 5/14; H01F 1/445; H01F 1/01
See application file for complete search history.

(56) References Cited

U.S. PATENT DOCUMENTS 2,856,365 A * 10/1958 Heck .................... C04B 35/2658
252/62.56
4,904,530 A * 2/1990 Huizing ............. G11B 5/70678
252/62.56
(Continued)

FOREIGN PATENT DOCUMENTS

CN 1528002 A 9/2004
CN 101045858 A 10/2007
(Continued)

OTHER PUBLICATIONS

Irfan, Salma et al. "Synthesis of Mn1-xZnxFe2O2 ferrite powder by co-precipitation method." 2014 IOP Conf. Ser.: Mater. Sci. Eng. 60 012048. http://iopscience.iop.org/article/10.1088/1757-899X/60/1/012048/pdf (Year: 2014).*

(Continued)

*Primary Examiner* — Nancy R Johnson
(74) *Attorney, Agent, or Firm* — Birch, Stewart, Kolasch & Birch, LLP

(57) ABSTRACT

A magnetic and thermally conductive material is provided, which includes a thermally conductive compound powder, and an iron-containing oxide at a surface of the thermally conductive compound powder, wherein the iron-containing oxide is an oxide of iron with an other metal, and the other metal is nickel, zinc, copper, cobalt, magnesium, manganese, yttrium, lithium, aluminum, or a combination thereof. A thermally conductive and dielectric layer is also provided, which includes a magnetic and thermally conductive material and a resin, wherein the thermally conductive material includes a thermally conductive compound powder, and an iron-containing oxide at a surface of the thermally conductive compound powder, wherein the iron-containing oxide is an oxide of iron with an other metal, and the other metal is (Continued)

nickel, zinc, copper, cobalt, magnesium, manganese, yttrium, lithium, aluminum, or a combination thereof.

20 Claims, 3 Drawing Sheets

(56) References Cited

U.S. PATENT DOCUMENTS

| | | | |
|---|---|---|---|
| 7,189,778 | B2 | 3/2007 | Tobita et al. |
| 7,291,381 | B2 | 11/2007 | Tobita et al. |
| 7,608,315 | B2 | 10/2009 | Uchida et al. |
| 8,017,674 | B2 | 9/2011 | Sano et al. |
| 8,277,936 | B2 * | 10/2012 | Boussaad ............ B29C 70/62 428/323 |
| 2013/0309485 | A1 | 11/2013 | Takayama et al. |
| 2014/0039076 | A1 * | 2/2014 | Katayama .......... C08G 18/6674 521/84.1 |

FOREIGN PATENT DOCUMENTS

| | | |
|---|---|---|
| CN | 101460305 A | 6/2009 |
| CN | 102421256 A | 4/2012 |
| CN | 102924923 A | 2/2013 |
| CN | 102956578 A | 3/2013 |
| CN | 103339174 A | 10/2013 |
| CN | 103476817 A | 12/2013 |
| CN | 104194325 A | 12/2014 |
| CN | 105073683 A | 11/2015 |
| JP | 2000-191998 A | 7/2000 |
| JP | 2001-172398 A | 6/2001 |
| TW | 200502344 A | 1/2005 |
| TW | I241005 B | 10/2005 |
| TW | I266176 B | 11/2006 |

OTHER PUBLICATIONS

Salehpour, Firooz et al. "Synthesis of Zn-Doped Manganese Ferrite nanoparticle Via Coprecipitation Method for Magnetic Resonance Imaging Contrast Agent." Journal of Nanotechnology. Mar. 2015. http://citeseerx.ist.psu.edu/viewdoc/download?doi=10.1.1.921.7830&rep=rep1&type=pdf (Year: 2015).*

Taiwanese Office Action and Search Report dated Jun. 6, 2016, for Taiwanese Application No. 104141059.

Cho et al., "Facile Orientation of Unmodified BN Nanosheets in Polysiloxane/BN Composite Films Using a High Magnetic Field," Journal of Materials Science, vol. 46, 2011 (Published online Nov. 24, 2010), pp. 2318-2323.

Cho et al., "Modification of BN Nanosheets and their Thermal Conducting Properties in Nanocomposite Film with Polysiloxane According to the Orientation of BN," Composites Science and Technology, vol. 71, 2011 (Available online Mar. 10, 2011), pp. 1046-1052.

Cho et al., "Thermal Anisotropy of Epoxy Resin-based Nano-hybrid Films Containing BN Nanosheets under a Rotating Superconducting Magnetic Field," Materials Chemistry and Physics, vol. 139, 2013, pp. 355-359.

Erb et al., "Composites Reinforced in Three Dimensions by Using Low Magnetic Fields," Science, vol. 335, Jan. 13, 2012, pp. 199-204 (Total 7 pages).

Lim et al., "Anisotropically Alignable Magnetic Boron Nitride Platelets Decorated with Iron Oxide Nanoparticles," Chemistry of Materials, vol. 25, 2013, pp. 3315-3319.

Lin et al., "Magnetic Alignment of Hexagonal Boron Nitride Platelets in Polymer Matrix: Toward High Performance Anisotropic Polymer Composites for Electronic Encapsulation," ACS Applied Materials & Interfaces, vol. 5, 2013, pp. 7633-7640.

Chinese Office Action dated Feb. 22, 2019, for Chinese Application No. 201511027071.1.

* cited by examiner

MAGNETIC AND THERMALLY CONDUCTIVE MATERIAL AND THERMALLY CONDUCTIVE AND DIELECTRIC LAYER

CROSS REFERENCE TO RELATED APPLICATIONS

The present application is based on, and claims priority from, Taiwan Application Serial Number 104141059, filed on Dec. 8, 2015, the disclosure of which is hereby incorporated by reference herein in its entirety.

TECHNICAL FIELD

The technical field relates to a composition of enhancing thermal conductivity of a dielectric layer, and in particular it relates to a magnetic and thermally conductive material added into the dielectric layer.

BACKGROUND

Circuit boards and the IC substrates produced for the optoelectronics and semiconductor industries are trending toward high-speed, high density, being intensive, and high integration because rise of "Cloud", "Internet" and "Internet of things", enhancements of 4G and 5G communication technologies, and improvement of display technologies. The required properties of the circuit boards and the IC substrates of the future are not only low dielectric constant and high insulation, but also low dielectric loss and high thermal conductivity. Moreover, they should be designed for heat dissipation of different applications, e.g. controlling the direction and distribution of their high thermal conductive path. For example, the copper foil substrate in a circuit board is concisely represented as copper foil/dielectric layer/copper foil, and the middle dielectric layer is usually composed of resin, glass fiber cloth, or insulation paper with low thermal conductivity. Therefore, the copper foil substrate has a poor thermal conductivity along its thickness direction. Enhancing the thermal conductivity of the middle dielectric layer may dramatically improve the thermal conductivity along its thickness direction. One conventional method adds a thermally conductive material into the dielectric layer. The thermally conductive material is usually randomly arranged, so that a large amount of the thermally conductive material should be added for increasing the thermal conductivity of the dielectric layer. However, too much thermally conductive material (filler) will dramatically increase the dielectric constant of the dielectric layer and the related cost. Another way is to magnetically align a high thermal conductive material along a specific direction (e.g. the thickness direction of the dielectric layer), thereby achieving a high thermal conductivity along a specific direction. However, the thermally conductive material should be inherently magnetic. A non-magnetic and thermally conductive material needs a magnetic field of high intensity (or a long magnetic alignment period) to be aligned.

Accordingly, a magnetic, insulative, low dielectric loss, and thermally conductive material is called for a dielectric layer with high thermal conductivity, insulation, and low dielectric loss.

SUMMARY

One embodiment of the disclosure provides a magnetic and thermally conductive material, comprising: a thermally conductive compound powder; and an iron-containing oxide at a surface of the thermally conductive compound powder, wherein the iron-containing oxide is an oxide of iron with an other metal, and the other metal is nickel, zinc, copper, cobalt, magnesium, manganese, yttrium, lithium, aluminum, or a combination thereof.

One embodiment of the disclosure provides a thermally conductive and dielectric layer, comprising: a magnetic and thermally conductive material and a resin, wherein the thermally conductive material comprises a thermally conductive compound powder, and an iron-containing oxide at a surface of the thermally conductive compound powder, wherein the iron-containing oxide is an oxide of iron with an other metal, and the other metal is nickel, zinc, copper, cobalt, magnesium, manganese, yttrium, lithium, aluminum, or a combination thereof.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
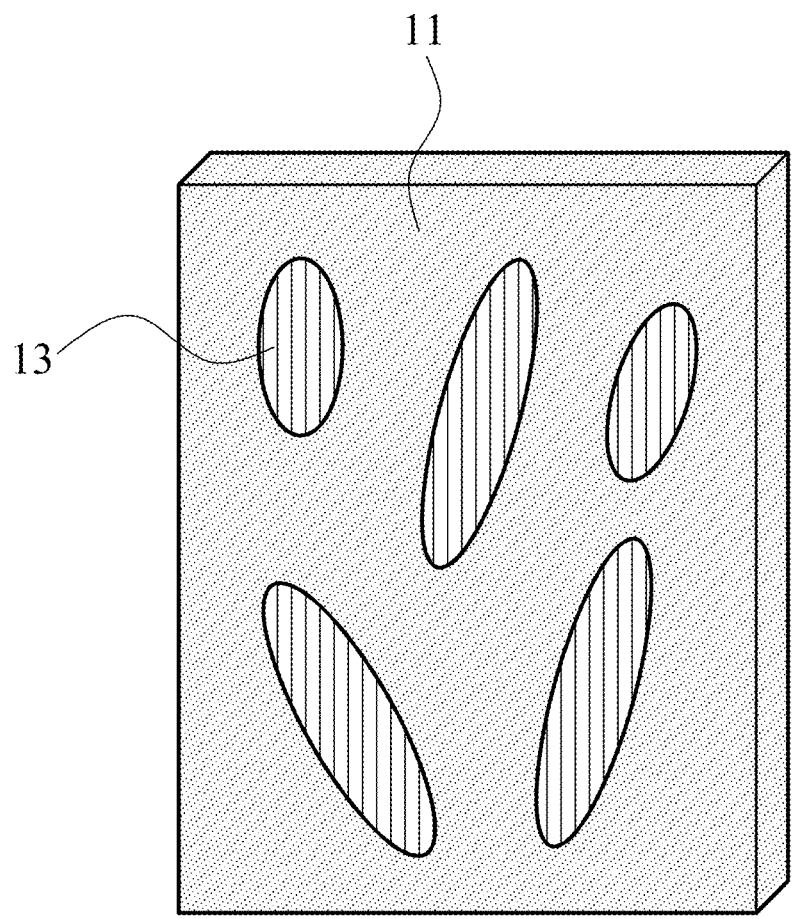
FIG. 1 shows a magnetic and thermally conductive material in one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment provides a magnetic and thermally conductive material including a thermally conductive compound powder 11 and an iron-containing oxide 13 on a surface of the thermally conductive compound powder 11, as shown in FIG. 1. The thermally conductive compound powder can be boron nitride, aluminum nitride, silicon nitride, silicon carbide, aluminum oxide, carbon nitride, octahedral carbon, tetrahedral carbon, or a combination thereof. In one embodiment, the thermally conductive compound powder has a particle size of 0.1 μm to 110 μm. An overly small thermally conductive compound powder is influenced by a thermal effect, such that the magnetic and thermally conductive material is difficult to align with a magnetic field. An overly large thermally conductive compound powder is easily influenced by gravity and difficult to control and align with a magnetic field. Note that the thermally conductive compound powder and the iron-containing oxide have a long axis, which means that their long axis dimensions (e.g. length) are greater than the dimensions in other directions (e.g. width or thickness).

In one embodiment, the thermally conductive compound powder has a long axis length to short axis length ratio of greater than 1.1 and less than or equal to 120, and the iron-containing oxide has a long axis length to short axis length ratio of greater than 1.1 and less than or equal to 40. If a thermally conductive compound powder has an overly low ratio of the long axis length to the short axis length, the magnetic and thermally conductive material cannot efficiently transfer heat along a specific direction. If an iron-containing oxide has an overly low ratio of the long axis length to the short axis length, the magnetic and thermally conductive material cannot efficiently transfer heat along a specific direction.

In one embodiment, a coating ratio (the weight % that the iron-containing oxide occupies magnetic and thermally conductive material) is about 0.05 wt % to 60 wt %. An overly low coating ratio make the thermally conductive material have an insufficient magnetic property, thereby needing a magnetic field of high intensity or a long period to align the magnetic and thermally conductive material. As a result, the equipment cost or manufacturing period is dramatically increased. An overly high coating ratio results in an overly large surface of the thermally conductive compound powder being covered by the iron-containing oxide (with a lower thermal conductivity). As a result, the thermal conductivity of the magnetic and thermally conductive material is reduced.

The iron-containing oxide is an oxide of iron with an other metal, and the other metal is nickel, zinc, copper, cobalt, magnesium, manganese, yttrium, lithium, aluminum, or a combination thereof.

The other metal and the iron of the iron-containing oxide have a molar ratio (other metal mole/iron mole=x/y) greater than 0 and less than or equal to 80. If the other metal and iron have a molar ratio of 0, the magnetic and thermally conductive material has a poor insulation and a high dielectric loss, it may result in conductive path and signal loss. If the metal and iron have an overly high molar ratio, the magnetic and thermally conductive material will have an insufficient magnetic property, thereby needing a magnetic field of high intensity or a long period to align the magnetic and thermally conductive material. As a result, the equipment cost or manufacturing period is dramatically increased.

In one embodiment, the magnetic and thermally conductive material has a saturation magnetization of greater than 0.03 emu/g and less than or equal to 40 emu/g. A magnetic and thermally conductive material with an overly low saturation magnetization is difficult to align with a normal magnetic field, thereby needing a magnetic field of high intensity or a long period to align the magnetic and thermally conductive material. As a result, the equipment cost or manufacturing period is dramatically increased. A magnetic and thermally conductive material with an overly high saturation magnetization means increasing an iron-containing oxide ratio, such that an overly large surface of the thermally conductive compound powder is covered by the iron-containing oxide (with a lower thermal conductivity). As a result, the thermal conductivity of the magnetic and thermally conductive material is reduced.

Figure 2:
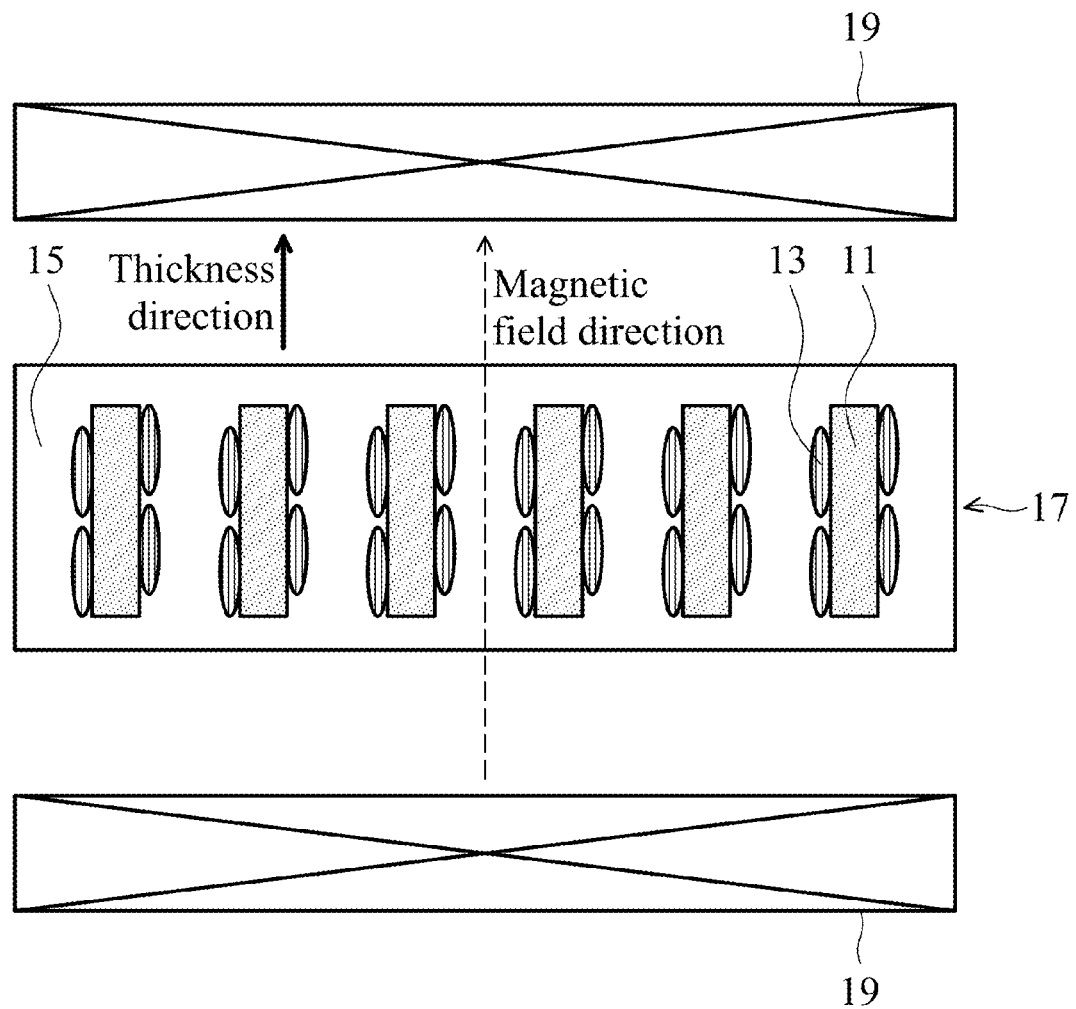
FIG. 2 shows a thermally conductive and dielectric layer in one embodiment of the disclosure.

The magnetic and thermally conductive material can be utilized in a thermally conductive and dielectric layer. After magnetic aligning the magnetic and thermally conductive material in the dielectric layer, the thermal conductivity of the dielectric layer can be enhanced. The thermally conductive compound powder 11 or the iron-containing oxide 13 of the magnetic and thermally conductive material has a long axis length to short axis length ratio of greater than 1.1. The magnetic and thermally conductive material (See FIG. 1) and a resin 15 is mixed to form a gel layer 17, a magnetic field is then applied to the gel layer 17 by an external magnetic field 19, thereby controlling a component ratio of the long axis of the magnetic and thermally conductive material along a direction of the magnetic field. The magnetically aligned resin is then cured to obtain a thermally conductive and dielectric layer, as shown in FIG. 2. Too less magnetic and thermally conductive material cannot efficiently enhance the thermal conductivity of the dielectric layer. Too much magnetic and thermally conductive material is difficult to magnetically align, and reduces the mechanical properties of the thermally conductive and dielectric layer. In one embodiment, the resin can be acrylic resin, epoxy resin, poly (phenolic ether) resin, polyimide resin, polyolefin resin, or a combination thereof, which can be stacked to form a multi-layered structure.

In one embodiment, the thermally conductive and dielectric layer includes 2 wt % to 90 wt % of the magnetic and thermally conductive material and 98 wt % to 10 wt % of the resin.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Ratios of a long axis length to a short axis length of thermally conductive compound powders were measured by a scanning electron microscope (commercially available from Oxford Instruments), which are listed in Table 1.

Examples 1-1 to 1-31

Thermally conductive compound powders were weighed according to numbers in Tables 1, 3, and 4, and then added into deionized water to form solutions $A_{1-1}$ to $A_{1-31}$, respectively. Chemicals were weighed according to element molar ratios and coating ratios in Tables 2 to 4, and then added into deionized water to form solutions $B_{1-1}$ to $B_{1-31}$. The coating ratio means a weight ratio that the iron-containing oxide occupied in a thermally conductive powder. In the following Examples and Comparative Examples, the coating ratio is used for illustration to be consistent with the Tables. The solutions $A_{1-1}$ to $A_{1-31}$ were added to the corresponding solutions $B_{1-1}$ to $B_{1-31}$ and mixed by a stirrer to form mixture liquids $C_{1-1}$ to $C_{1-31}$. The mixture liquids $C_{1-1}$ to $C_{1-31}$ were heated to and stabilized at 80° C. A sodium hydroxide aqueous solution was added into the mixture liquids $C_{1-1}$ to $C_{1-31}$ for tuning them to be basic. The basic mixture liquids were stirred for 30 minutes, heated to 800° C., and then cooled to room temperature, thereby obtaining samples of Examples 1-1 to 1-31 (Magnetic and thermally conductive materials). Appropriate amounts of the samples in Examples 1-31 to 1-31 were weighed to measure their saturation magnetization values by a vibrating sample magnetometer (MODEL 7304, commercially available from Lake Shore). Appropriate amounts of the samples in Examples 1-1 to 1-31 were put into a mold, respectively, and then pressed to mold the samples with a diameter of about 10 mm and a thickness of 2 mm. Resistivity values of the samples were measured by an ammeter (KEITHLEY 617 source meter). Dielectric loss values of the samples were measured by an LCR meter (E4291B 16453A test fixture). Ratios of a long axis length to a short axis length of the iron-containing oxide in the some samples were measured by a scanning electron microscope (commercially available from Oxford Instruments). The measured values are listed in Tables 3 and 4.

Examples 2-1 to 2-3

Thermally conductive compound powders were weighed according to numbers in Tables 1 and 5, and then added into deionized water to form solutions $A_{2-1}$ to $A_{2-3}$, respectively. Chemicals were weighed according to element molar ratios and coating ratios in Tables 2 and 5, and then added into deionized water to form solutions $B_{2-1}$ to $B_{2-3}$. The solutions $A_{2-1}$ to $A_{2-3}$ were added to the corresponding solutions $B_{2-1}$ to $B_{2-3}$ and mixed by a stirrer to form mixture liquids $C_{2-1}$ to $C_{2-3}$. The mixture liquids $C_{2-1}$ to $C_{2-3}$ were heated to and stabilized at 80° C. A sodium hydroxide aqueous solution was added into the mixture liquids $C_{2-1}$ to $C_{2-3}$ for tuning them to be basic. The basic mixture liquids were stirred for 30 minutes, heated to 800° C., and then cooled to room temperature, thereby obtaining samples of Examples 2-1 to 2-3 (Magnetic and thermally conductive materials). Appropriate amounts of the samples in Examples 2-1 to 2-3 were weighed to measure their saturation magnetization values by a vibrating sample magnetometer (MODEL 7304, commercially available from Lake Shore). Appropriate amounts of the samples in Examples 2-1 to 2-3 were put into a mold, respectively, and then pressed to mold the samples with a diameter of about 10 mm and a thickness of 2 mm. Resistivity values of the samples were measured by an ammeter (KEITHLEY 617 source meter). The measured values are listed in Table 5.

Examples 3-1 and 3-2

Thermally conductive compound powders were weighed according to numbers in Table 5, and then added into deionized water to form solutions $A_{3-1}$ and $A_{3-2}$, respectively. Chemicals were weighed according to element molar ratios and coating ratios in Tables 2 and 5, and then added into deionized water to form solutions $B_{3-1}$ and $B_{3-2}$. The solutions $B_{3-1}$ and $B_{3-2}$ were heated to and stabilized at 80° C. A sodium hydroxide aqueous solution was added into the solutions $B_{3-1}$ and $B_{3-2}$ for tuning them to be basic. The basic solutions were stirred for 30 minutes, heated to 800° C. and 1000° C., respectively, and then cooled to room temperature, thereby obtaining magnetic powders $D_{3-1}$ and $D_{3-2}$. The magnetic powders $D_{3-1}$ and $D_{3-2}$ were added to the corresponding solutions $A_{3-1}$ and $A_{3-2}$ and mixed by a stirrer. Nitric acid aqueous solution was added to the mixtures for tuning them to be acidic. The acidified mixtures were stirred by a stirrer for 30 minutes and then baked in an oven to be dry, thereby obtaining samples of Examples 3-1 and 3-2 (Magnetic and thermally conductive materials). Appropriate amounts of the samples in Examples 3-1 and 3-2 were weighed to measure their saturation magnetization values by a vibrating sample magnetometer (MODEL 7304, commercially available from Lake Shore). Appropriate amounts of the samples in Examples 3-1 and 3-2 were put into a mold, respectively, and then pressed to mold the samples with a diameter of about 10 mm and a thickness of 2 mm. Resistivity values of the samples were measured by an ammeter (KEITHLEY 617 source meter). The measured values are listed in Table 5.

Examples 4-1 to 4-12

Figure 3A:
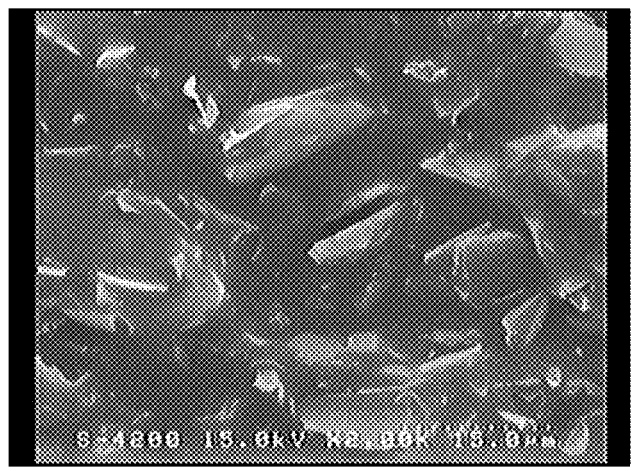
FIGS. 3A and 3B show cross sectional photographs (obtained by scanning electron microscope) of a gel layer before and after a magnetic field alignment in one embodiment of the disclosure.
Figure 3B:
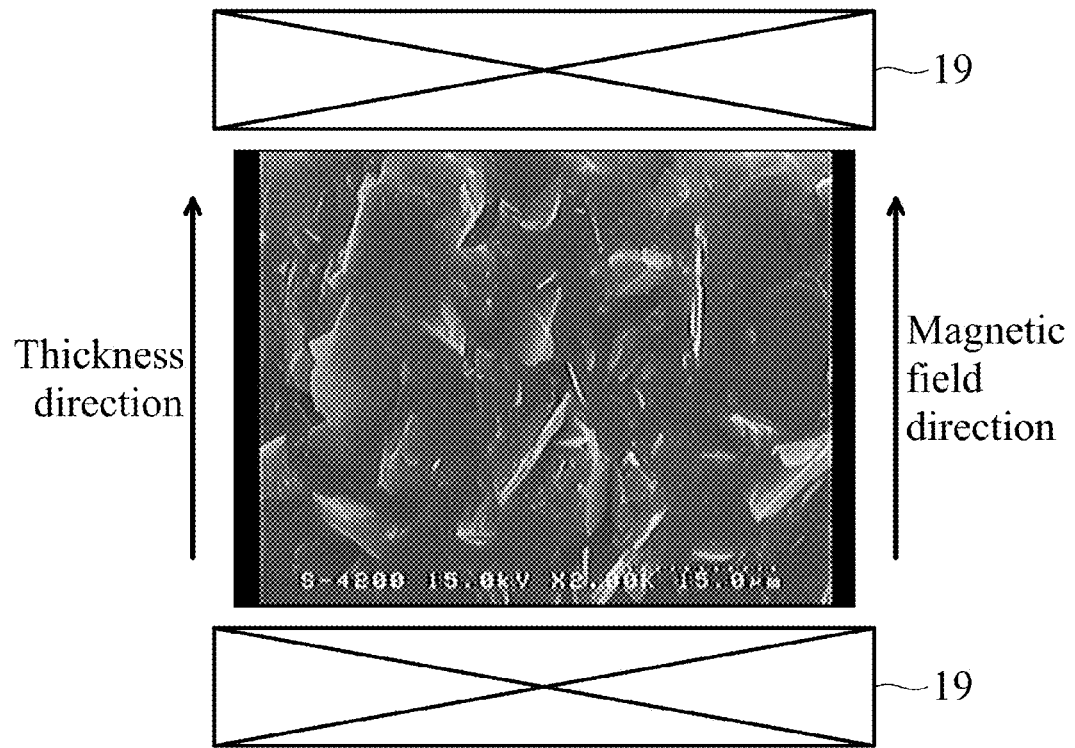

The magnetic and thermally conductive materials in Tables 4 and 5 and the resins in Table 6 were mixed according to the magnetic and thermally conductive material ratios (wt %) in Table 6. The mixtures were coated to form gel layers C4-1 to C4-12. The gel layers were put into an external magnetic field system 16 to magnetically align with a magnetic field of 1.25 Tesla for periods as shown in Table 6. The external magnetic field direction was parallel to the thickness direction of the gel layers, as shown in FIG. 2. The magnetically aligned gel layers were put into an oven and baked to dry, thereby obtaining samples of Examples 4-1 to 4-12. The thermal conductivity along the thickness direction of the thermally conductive dielectric layers before and after the magnetic alignment were measured by a thermal resistance and conductivity measurement apparatus (LW 9389). The increase ratio of the thermal conductivity through the magnetic field alignment can be calculated by following formula: The increase ratio of the thermal conductivity through the magnetic field alignment=(the thermal conductivity after the magnetic field alignment—the thermal conductivity before the magnetic field alignment)/(the thermal conductivity before the magnetic field alignment)*100%. The measured values are listed in Table 6. The samples before and after the magnetic field alignment in Example 4-8 were measured by a scanning electron microscope (commercially available from Hitachi) to obtain photographs of their cross sections, as shown in FIGS. 3A and 3B.

Comparative Example 1

A thermally conductive compound powder was weighed according to number in Tables 1 and 3, and then added into deionized water to form a solution $E_1$. A chemical was weighed according to an element molar ratio and a coating ratio in Tables 2 and 3, and then added into deionized water to form a solution $F_1$. The solution $E_1$ was added to the solution $F_1$ and mixed by a stirrer to form a mixture liquid $G_1$. The mixture liquid $G_1$ was heated to and stabilized at 80° C. A sodium hydroxide aqueous solution was added into the mixture liquid $G_1$ for tuning it to be basic. The basic mixture liquid was stirred for 30 minutes, heated to 800° C., and then cooled to room temperature, thereby obtaining a sample of Comparative Example 1. An appropriate amount of the sample in Comparative Example 1 was weighed to measure its saturation magnetization value by a vibrating sample magnetometer (MODEL 7304, commercially available from Lake Shore). An appropriate amount of the sample in Comparative Example 1 was put into a mold, and then pressed to mold the sample with a diameter of about 10 mm and a thickness of 2 mm. A resistivity value of the sample was measured by an ammeter (KEITHLEY 617 source meter). A dielectric loss value of the sample was measured by an LCR meter (E4291B 16453A test fixture). A ratio of a long axis length to a short axis length of the iron-containing oxide in the sample was measured by a scanning electron microscope (commercially available from Oxford Instruments). The measured values are listed in Table 3.

Comparative Examples 2-1 to 2-3

The thermally conductive compound powder according to number 3 in Table 1 was weighed, and then added into deionized water to form solutions $E_{2-1}$ to $E_{2-3}$. Chemicals were weighed according to element molar ratios and coating ratios in Tables 2 and 4, and then added into deionized water to form solutions $F_{2-1}$ to $F_{2-3}$. The solutions $E_{2-1}$ to $E_{2-3}$ were added to the corresponding solutions $F_{2-1}$ to $F_{2-3}$ and mixed by a stirrer to form mixture liquids $G_{2-1}$ to $G_{2-3}$. The mixture liquids $G_{2-1}$ to $G_{2-3}$ were heated to and stabilized at 80° C.

A sodium hydroxide aqueous solution was added into the mixture liquids $G_{2-1}$ to $G_{2-3}$ for tuning them to be basic. The basic mixture liquids were stirred for 30 minutes, and then baked in an oven to be dry, thereby obtaining samples of Comparative Examples 2-1 to 2-3. Appropriate amounts of the samples in Comparative Examples 2-1 to 2-3 were weighed to measure their saturation magnetization values by a vibrating sample magnetometer (MODEL 7304, commercially available from Lake Shore). Appropriate amounts of the samples in Comparative Examples 2-1 to 2-3 were put into a mold, and then pressed to mold the sample with a diameter of about 10 mm and a thickness of 2 mm. Resistivity values of the samples were measured by an ammeter (KEITHLEY 617 source meter). Dielectric loss values of the samples were measured by an LCR meter (E4291B 16453A test fixture). Ratios of a long axis length to a short axis length of the iron oxide in the samples were measured by a scanning electron microscope (commercially available from Oxford Instruments). The measured values are listed in Table 4.

Comparative Example 3

A thermally conductive compound powder according to number 5 in Table 1 was weighed, and then added into deionized water to form a solution $E_3$. A chemical was weighed according to an element molar ratio and a coating ratio in Tables 2 and 5, and then added into deionized water to form a solution $F_3$. The solution $E_3$ was added to the solution $F_3$ and mixed by a stirrer to form a mixture liquid $G_3$. The mixture liquid $G_3$ was heated to and stabilized at 80° C. A sodium hydroxide aqueous solution was added into the mixture liquid $G_3$ for tuning it to be basic. The basic mixture liquid was stirred for 30 minutes, heated to 800° C., and then cooled to room temperature, thereby obtaining a sample of Comparative Example 3. An appropriate amount of the sample in Comparative Example 3 was weighed to measure its saturation magnetization value by a vibrating sample magnetometer (MODEL 7304, commercially available from Lake Shore). An appropriate amount of the sample in Comparative Example 3 was put into a mold, and then pressed to mold the sample with a diameter of about 10 mm and a thickness of 2 mm. A resistivity value of the sample was measured by an ammeter (KEITHLEY 617 source meter). The measured values are listed in Table 5.

Comparative Example 4

A thermally conductive compound powder according to number 10 in Table 1 was weighed, and then added into deionized water to form a solution $E_4$. A Chemical was weighed according to an element molar ratio and a coating ratio in Tables 2 and 5, and then added into deionized water to form a solution $F_4$. The solution $F_4$ was heated to and stabilized at 80° C. A sodium hydroxide aqueous solution was added into the solution $F_4$ for tuning it to be basic. The basic solution was stirred for 30 minutes, heated to 800° C., and then cooled to room temperature, thereby obtaining a magnetic powder $G_4$. The magnetic powder $G_4$ was added to the solution $E_4$ and mixed by a stirrer. Nitric acid aqueous solution was added to the mixture for tuning it to be acidic. The acidified mixture was stirred by a stirrer for 30 minutes and then baked in an oven to be dry, thereby obtaining a sample of Comparative Example 4. An appropriate amount of the sample in Comparative Example 4 was weighed to measure its saturation magnetization value by a vibrating sample magnetometer (MODEL 7304, commercially available from Lake Shore). An appropriate amount of the sample in Comparative Example 4 was put into a mold, and then pressed to mold the sample with a diameter of about 10 mm and a thickness of 2 mm. A Resistivity value of the sample was measured by an ammeter (KEITHLEY 617 source meter). The measured values are listed in Table 5.

Comparative Example 5

The magnetic and thermally conductive material in Comparative Example 3 and an acrylic resin in Table 6 were mixed according to the magnetic and thermally conductive material ratios (wt %) in Table 6. The mixture was coated to form a gel layer $E_5$. The gel layer was put into an external magnetic field system 16 to magnetically align with a magnetic field of 1.25 Tesla for a period as shown in Table 6. The external magnetic field direction was parallel to the thickness direction of the gel layer, as shown in FIG. 2. The magnetically aligned gel layer was put into an oven and baked to dry, thereby obtaining a sample of Comparative Example 5. The thermal conductivity along the thickness direction of the thermally conductive dielectric layer before and after the magnetic alignment was measured by a thermal resistance and conductivity measurement apparatus (LW 9389). The increase ratio of the thermal conductivity through the magnetic field alignment can be calculated by following formula: The increase ratio of the thermal conductivity through the magnetic field alignment=(the thermal conductivity after the magnetic field alignment—the thermal conductivity before the magnetic field alignment)/(the thermal conductivity before the magnetic field alignment) *100%. The measured values are listed in Table 6.

As proven in Comparative Example 1, if the other metal of the iron-containing oxide includes a similar coating ratio of undesired metal (e.g. barium, bismuth, or tin), the iron-containing oxide will have an overly low saturation magnetization. As such, it is difficult to control the alignment direction of the magnetic and thermally conductive material by the magnetic field. Moreover, the iron-containing oxide with the undesired metal had a small ratio of its long axis to short axis, such that the magnetic and thermally conductive material cannot efficiently transfer heat along a specific direction. In Comparative Examples 2-1 to 2-3, the iron oxide free of other metal had an overly high resistivity loss and dielectric loss, which resulted in an electrically conductive path and a signal loss. In Comparative Example 4, the thermally conductive filler was graphite with an overly high electrically conductivity, it resulted in an electrically conductive path that was unsuitable for a thermally conductive and dielectric layer. In comparative Example 5, the magnetic and thermally conductive compound powder (from Example 3) had a long axis length to short axis length ratio of 1, it could not efficiently transfer heat along a specific direction, such that the increase ratio of the thermal conductivity through the magnetic field alignment was almost zero. In Examples, the thermally conductive compounds of the thermally conductive and dielectric layers and the iron-containing oxide had a long axis length to short axis length ratio of greater than 1.1 and magnetic property, which can magnetically align with a magnetic field to control a component ratio of the long axis of the magnetic and thermally conductive material along the direction of the magnetic field, as shown in FIGS. 3A and 3B. In other words, the thermal conductivity of the dielectric layer can be enhanced to be utilized in different application fields, e.g. a thermally conductive sheet, an optoelectronic device substrate, a printed circuit board, a semiconductor substrate, a packaging material, a encapsulating material.

TABLE 1

| Thermally conductive compound powder No. | Thermally conductive compound powder composition | Thermally conductive compound powder particle size | Ratio of long axis length/short axis length of thermally conductive compound powder | Supplier |
| --- | --- | --- | --- | --- |
| 1 | Boron nitride | Average particle size = 0.5 μm | 15 | Lowerfriction |
| 2 | Boron nitride | Average particle size = 1.5 μm | 110 | Lowerfriction |
| 3 | Boron nitride | D50 = 7 μm | 68 | Saint Gobain |
| 4 | Boron nitride | Average particle size = 12 μm, Maximum particle size = 60 μm | 10 | Saint Gobain |
| 5 | Boron nitride | Average particle size = 30 μm, Maximum particle size = 103 μm | 6 | Saint Gobain |
| 6 | Aluminum nitride | D50 = 5 μm | 1.8 | FirstCo Corp. |
| 7 | Silicon carbide | 1200 Mesh | 3.1 | FirstCo Corp. |
| 8 | Aluminum oxide | D50 = 3 μm | 1.2 | Ceramet, Inc. |
| 9 | Aluminum oxide | D50 = 3 μm | 1.0 | Showa Denko |
| 10 | Graphite | D50 = 13 μm | 38 | HOMYTECH Co. Ltd. |

TABLE 2

| Names of Chemicals | Chemical formula | Names of Chemicals | Chemical formula |
| --- | --- | --- | --- |
| Iron nitrate hydrate | $Fe(NO_3)_3 \cdot 9H_2O$ | Tin chloride hydrate | $SnCl_2 \cdot 2H_2O$ |
| Nickel nitrate hydrate | $Ni(NO_3)_2 \cdot 6H_2O$ | Magnesium nitrate hydrate | $Mg(NO_3)_2 \cdot 6H_2O$ |
| Zinc nitrate hydrate | $Zn(NO_3)_2 \cdot 6H_2O$ | Manganese acetate hydrate | $Mn(CH_3COO)_2 \cdot 4H_2O$ |
| Lithium nitrate | $LiNO_3$ | Iron chloride hydrate | $FeCl_3 \cdot 6H_2O$ |
| Copper chloride | $CuCl_2$ | Ferrous chloride hydrate | $FeCl_2 \cdot 4H_2O$ |
| Cobalt chloride | $CoCl_2$ | | |
| Yttrium nitrate hydrate | $Y(NO_3)_3 \cdot 6H_2O$ | | |
| Aluminum nitrate hydrate | $Al(NO_3)_3 \cdot 9H_2O$ | | |
| Barium chloride hydrate | $BaCl_2 \cdot 2H_2O$ | | |
| Bismuth nitrate hydrate | $Bi(NO_3)_3 \cdot 5H_2O$ | | |

TABLE 3

| | Thermally conductive compound powder No. | x/y | Element molar ratio | Coating ratio (wt %) | Saturation magnetization (emu/g) | Resistivity ($\Omega \cdot cm$) | Dielectric loss (@0.85 GHz) | Ratio of Long axis length to short axis length of iron-containing oxide |
| --- | --- | --- | --- | --- | --- | --- | --- | --- |
| Example 1-1 | 3 | 0.5 | Ni:Fe = 1:2 | 12.5 | 3.02 | 2.92E+11 | 2.69E−03 | 4.4 |
| Example 1-2 | 3 | 0.5 | Ni:Zn:Fe = 0.8:0.2:2 | 12.5 | 4.61 | 8.66E+09 | 1.66E−03 | 9 |
| Example 1-3 | 3 | 0.5 | Ni:Cu:Zn:Fe = 0.4:0.2:0.4:2 | 12.5 | 2.75 | 7.85E+11 | 2.50E−03 | 11.7 |
| Example 1-4 | 3 | 0.5 | Ni:Co:Fe = 0.5:0.5:2 | 12.5 | 4.08 | 4.73E+11 | 3.04E−03 | 11 |
| Example 1-5 | 3 | 0.5 | Mg:Mn:Fe = 0.9:0.1:2 | 25 | 4.48 | 1.08E+09 | 2.88E−03 | 7.2 |
| Example 1-6 | 3 | 0.5 | Ni:Y:Zn:Fe = 0.6:0.2:0.2:2 | 12.5 | 0.28 | 5.00E+11 | 2.82E−03 | 10 |
| Example 1-7 | 3 | 0.75 | Ni:Li:Fe = 0.5:1:2 | 12.5 | 1.34 | 3.81E+11 | 3.05E−03 | 1.7 |
| Example 1-8 | 3 | 2 | Ni:Al:Fe = 1:1:1 | 12.5 | 1.04 | 2.72E+11 | 3.98E−03 | 21.8 |
| Example 1-9 | 3 | 3 | Ni:Al:Fe = 1.2:1.2:0.8 | 12.5 | 0.71 | 5.98E+10 | 4.52E−03 | 12 |
| Comparative Example 1 | 3 | 0.5 | Ba:Bi:Sn:Fe = 0.2:0.4:0.4:2 | 12.5 | 0.03 | 4.06E+11 | 6.63E−03 | 1 |

TABLE 4

| | Thermally conductive compound powder No. | x/y | Element molar ratio | Coating ratio (wt %) | Saturation magnetization (emu/g) | Resistivity ($\Omega \cdot cm$) | Dielectric loss (@0.85 GHz) | Ratio of Long axis length to short axis length of iron-containing oxide |
|---|---|---|---|---|---|---|---|---|
| Comparative Example 2-1 | 3 | 0 | Fe = 1 | 12.5 | 3.64 | 2.36E+08 | 3.91E−02 | 1 |
| Comparative Example 2-2 | 3 | 0 | Fe = 1 | 25 | 10.86 | 1.91E+06 | 9.05E−02 | Not measured |
| Comparative Example 2-3 | 3 | 0 | Fe = 1 | 40 | 12.88 | 3.15E+05 | 2.85E−01 | Not measured |
| Example 1-10 | 3 | 0.01 | Ni:Zn:Fe = 0.024:0.006:2.97 | 12.5 | 0.32 | 6.02E+11 | 3.68E−04 | 2.1 |
| Example 1-11 | 3 | 0.02 | Ni:Zn:Fe = 2.323:0.581:0.097 | 12.5 | 0.37 | 8.30E+11 | 1.78E−03 | 20 |
| Example 1-12 | 3 | 0.1 | Ni:Zn:Fe = 0.22:0.06:2.73 | 12.5 | 2.50 | 1.09E+09 | 1.29E−04 | 1.5 |
| Example 1-13 | 3 | 0.2 | Ni:Zn:Fe = 0.4:0.1:2.5 | 12.5 | 3.74 | 3.25E+11 | 4.54E−03 | 12.9 |
| Example 1-14 | 3 | 0.5 | Ni:Zn:Fe = 0.8:0.2:2 | 0.1 | 0.06 | 6.42E+11 | 2.45E−04 | 6.7 |
| Example 1-15 | 3 | 0.5 | Ni:Zn:Fe = 0.8:0.2:2 | 0.2 | 0.07 | 7.48E+11 | 5.15E−04 | Not measured |
| Example 1-16 | 3 | 0.5 | Ni:Zn:Fe = 0.8:0.2:2 | 0.5 | 0.22 | 4.10E+11 | 3.94E−03 | Not measured |
| Example 1-17 | 3 | 0.5 | Ni:Zn:Fe = 0.8:0.2:2 | 2 | 1.05 | 8.20E+11 | 1.98E−04 | 13 |
| Example 1-18 | 3 | 0.5 | Ni:Zn:Fe = 0.8:0.2:2 | 30 | 16.49 | 3.84E+11 | 4.29E−03 | Not measured |
| Example 1-19 | 3 | 0.5 | Ni:Zn:Fe = 0.8:0.2:2 | 40 | 18.79 | 6.16E+08 | 5.19E−03 | 12.9 |
| Example 1-20 | 3 | 0.5 | Ni:Zn:Fe = 0.8:0.2:2 | 50 | 26.63 | 2.39E+08 | 1.05E−02 | Not measured |
| Example 1-21 | 1 | 0.5 | Ni:Zn:Fe = 0.8:0.2:2 | 2 | 0.50 | 4.54E+11 | 5.23E−03 | Not measured |
| Example 1-22 | 1 | 0.5 | Ni:Zn:Fe = 0.8:0.2:2 | 25 | 4.18 | 3.86E+08 | 8.13E−03 | 10.7 |
| Example 1-23 | 2 | 0.5 | Ni:Zn:Fe = 0.8:0.2:2 | 2 | 0.11 | 6.92E+11 | 6.43E−03 | 10.3 |
| Example 1-24 | 2 | 0.5 | Ni:Zn:Fe = 0.8:0.2:2 | 5 | 0.36 | 9.77E+11 | 8.59E−03 | Not measured |
| Example 1-25 | 4 | 0.5 | Ni:Zn:Fe = 0.8:0.2:2 | 25 | 2.81 | 6.30E+08 | 6.90E−05 | 10.5 |
| Example 1-26 | 5 | 0.5 | Ni:Zn:Fe = 0.8:0.2:2 | 2 | 0.87 | 8.19E+11 | 2.52E−03 | 6.1 |
| Example 1-27 | 3 | 0.6 | Ni:Zn:Fe = 0.9:0.23:1.88 | 12.5 | 2.65 | 3.30E+11 | 3.24E−03 | Not measured |
| Example 1-28 | 3 | 5 | Ni:Zn:Fe = 2:0.5:0.5 | 12.5 | 0.59 | 2.97E+09 | 2.21E−03 | 4.4 |
| Example 1-29 | 3 | 30 | Ni:Zn:Fe = 2.323:0.581:0.097 | 12.5 | 0.06 | 9.61E+11 | 2.41E−03 | 13.1 |
| Example 1-30 | 3 | 40 | Ni:Zn:Fe = 2.342:0.585:0.073 | 12.5 | 0.08 | 4.80E+11 | 3.27E−03 | 33 |
| Example 1-31 | 3 | 60 | Ni:Zn:Fe = 0.8:0.2:2 | 12.5 | 0.06 | 7.51E+11 | 2.62E−03 | 16.3 |

TABLE 5

| | Thermally conductive compound powder No. | x/y | Element molar ratio | Coating ratio (wt %) | Saturation magnetization (emu/g) | Resistivity ($\Omega \cdot cm$) |
|---|---|---|---|---|---|---|
| Example 2-1 | 7 | 0.5 | Ni:Zn:Fe = 0.8:0.2:2 | 12.5 | 8.86 | 4.27E+08 |
| Example 2-2 | 8 | 0.5 | Ni:Zn:Fe = 0.8:0.2:2 | 25 | 8.80 | 8.86E+08 |
| Example 2-3 | 8 | 0.5 | Ni:Zn:Fe = 0.8:0.2:2 | 2 | 0.25 | 7.64E+08 |
| Example 3-1 | 6 | 0.6 | Y:Fe = 3:5 | 12.5 | 3.84 | 2.22E+08 |
| Example 3-2 | 6 | 0.5 | Ni:Zn:Fe = 0.8:0.2:2 | 12.5 | 0.31 | 7.59E+10 |
| Comparative Example 3 | 9 | 0.5 | Ni:Zn:Fe = 0.8:0.2:2 | 2 | 0.66 | 3.65E+08 |
| Comparative Example 4 | 10 | 0.5 | Ni:Zn:Fe = 0.8:0.2:2 | 12.5 | 7.92 | 9.96E−01 |

TABLE 6

| | Resin | Magnetic and thermally conductive material | Magnetic and thermally conductive material ratio (wt %) | Magnetic field alignment period (min) | Thermal conductivity before the magnetic field alignment (W/mK) | Thermal conductivity after the magnetic field alignment (W/mK) | Increase ratio of the thermal conductivity through the magnetic field alignment (%) |
|---|---|---|---|---|---|---|---|
| Example 4-1 | Acrylic resin | Example 1-17 | 5 | 1 | 0.204 | 0.255 | 25.0 |
| Example 4-2 | Acrylic resin | Example 1-17 | 10 | 1 | 0.265 | 0.325 | 22.6 |
| Example 4-3 | Acrylic resin | Example 1-17 | 40 | 1 | 1.339 | 2.392 | 78.6 |
| Example 4-4 | Acrylic resin | Example 1-17 | 50 | 1 | 1.373 | 1.849 | 34.7 |
| Example 4-5 | Acrylic resin | Example 1-17 | 60 | 1 | 0.848 | 1.167 | 37.7 |
| Example 4-6 | Acrylic resin | Example 1-17 | 70 | 1 | 1.317 | 1.712 | 30.0 |
| Example 4-7 | Acrylic resin | Example 1-17 | 85 | 1 | 0.663 | 0.731 | 10.3 |
| Example 4-8 | Acrylic resin | Example 1-2 | 40 | 2 | 0.806 | 1.326 | 64.5 |
| Example 4-9 | Acrylic resin | Example 1-26 | 40 | 1 | 4.189 | 4.8 | 14.6 |
| Example 4-10 | Acrylic resin | Example 1-23 | 40 | 1 | 0.535 | 0.685 | 28.0 |
| Example 4-11 | Acrylic resin | Example 2-3 | 40 | 1 | 0.563 | 0.7325 | 30.1 |
| Example 4-12 | Epoxy resin | Example 1-17 | 40 | 1 | 0.59 | 0.66 | 11.9 |
| Comparative Example 5 | Acrylic resin | Comparative Example 3 | 40 | 1 | 0.643 | 0.642 | −0.2 |

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A magnetic and thermally conductive material, comprising:
   a thermally conductive compound powder; and
   an iron-containing oxide at and in contact with a surface of the thermally conductive compound powder,
   wherein the iron-containing oxide is an oxide of iron with an other metal, and the other metal is (1) a combination of Ni and Zn, (2) Y, (3) Ni, (4) a combination of Ni, Cu and Zn, (5) a combination of Mg and Mn, (6) a combination of Ni, Y and Zn, or (7) a combination of Ni and Li, and
   wherein the other metal and the iron of the iron-containing oxide have a molar ratio of greater than 0 and less than or equal to 0.75.

2. The magnetic and thermally conductive material as claimed in claim 1, wherein the thermally conductive compound powder has a long axis length to a short axis length ratio of greater than 1.1.

3. The magnetic and thermally conductive material as claimed in claim 1, wherein the thermally conductive compound powder has a particle size of 0.1 μm to 110 μm.

4. The magnetic and thermally conductive material as claimed in claim 1, wherein the thermally conductive compound powder comprises boron nitride, aluminum nitride, silicon nitride, silicon carbide, aluminum oxide, carbon nitride, octahedral carbon, tetrahedral carbon, or a combination thereof.

5. The magnetic and thermally conductive material as claimed in claim 1, wherein the iron-containing oxide occupies 0.05 wt % to 60 wt % of the magnetic and thermally conductive material.

6. The magnetic and thermally conductive material as claimed in claim 1, wherein the iron-containing oxide has a long axis length to a short axis length ratio of greater than 1.1.

7. The magnetic and thermally conductive material as claimed in claim 1, having a saturation magnetization of greater than 0.03 emu/g.

8. The magnetic and thermally conductive material as claimed in claim 1, wherein the magnetic and thermally conductive material has a unit saturation magnetization of greater than or equal to 0.0224 emu/g·wt % and less than or equal to 0.7088 emu/g·wt %.

9. A thermally conductive and dielectric layer, comprising:
   a magnetic and thermally conductive material and a resin,
   wherein the thermally conductive material comprises a thermally conductive compound powder, and an iron-containing oxide at and in contact with a surface of the thermally conductive compound powder,
   wherein the iron-containing oxide is an oxide of iron with an other metal, and the other metal is (1) a combination of Ni and Zn, (2) Y, (3) Ni, (4) a combination of Ni, Cu and Zn, (5) a combination of Mg and Mn, (6) a combination of Ni, Y and Zn, or (7) a combination of Ni and Li, and wherein the other metal and the iron of the iron-containing oxide have a molar ratio of greater than 0 and less than or equal to 0.75.

10. The thermally conductive and dielectric layer as claimed in claim 9, wherein the magnetic and thermally conductive material occupies 2 wt % to 90 wt % of the thermally conductive and dielectric layer.

11. The thermally conductive and dielectric layer as claimed in claim 9, wherein the thermally conductive compound powder has a long axis length to a short axis length ratio of greater than 1.1.

12. The thermally conductive and dielectric layer as claimed in claim 9, wherein the thermally conductive compound powder has a particle size of 0.1 μm to 110 μm.

13. The thermally conductive and dielectric layer as claimed in claim 9, wherein the thermally conductive compound powder comprises boron nitride, aluminum nitride, silicon nitride, silicon carbide, aluminum oxide, carbon nitride, octahedral carbon, tetrahedral carbon, or a combination thereof.

14. The thermally conductive and dielectric layer as claimed in claim 9, wherein the iron-containing oxide occupies 0.05 wt % to 60 wt % of the magnetic and thermally conductive material.

15. The thermally conductive and dielectric layer as claimed in claim 9, wherein the iron-containing oxide has a long axis length to a short axis length ratio of greater than 1.1.

16. The thermally conductive and dielectric layer as claimed in claim 9, having a saturation magnetization of greater than 0.03 emu/g.

17. The thermally conductive and dielectric layer as claimed in claim 9, wherein the resin comprises acrylic resin, epoxy resin, poly(phenolic ether) resin, polyimide resin, polyolefin resin, or a combination thereof.

18. The thermally conductive and dielectric layer as claimed in claim 9, wherein the magnetic and thermally conductive material magnetically aligns with a magnetic field for controlling a component ratio of a long axis of the magnetic and thermally conductive material along a direction of the magnetic field.

19. The thermally conductive and dielectric layer as claimed in claim 9, being applied to a thermally conductive sheet, an optoelectronic device substrate, a printed circuit board, a semiconductor substrate, a packaging material, or an encapsulating material.

20. The magnetic and thermally conductive layer as claimed in claim 9, wherein the magnetic and thermally conductive material has a unit saturation magnetization of greater than or equal to 0.0224 emu/g·wt % and less than or equal to 0.7088 emu/g·wt %.

* * * * *